US010846322B1

(12) United States Patent
Ghamsari et al.

(10) Patent No.: US 10,846,322 B1
(45) Date of Patent: Nov. 24, 2020

(54) AUTOMATIC ANNOTATION FOR VEHICLE DAMAGE

(71) Applicant: Capital One Services, LLC, McLean, VA (US)

(72) Inventors: Avid Ghamsari, Frisco, TX (US); Geoffrey Dagley, McKinney, TX (US); Micah Price, Plano, TX (US); Qiaochu Tang, The Colony, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/786,695

(22) Filed: Feb. 10, 2020

(51) Int. Cl.
| *G06F 16/00* | (2019.01) |
| *G06F 16/45* | (2019.01) |
| *G06N 20/00* | (2019.01) |
| *G06K 9/62* | (2006.01) |
| *G06F 16/48* | (2019.01) |

(52) U.S. Cl.
CPC .............. *G06F 16/45* (2019.01); *G06F 16/48* (2019.01); *G06K 9/627* (2013.01); *G06N 20/00* (2019.01)

(58) Field of Classification Search
CPC ........ G06F 16/45; G06F 16/48; G06F 16/489; G06F 16/248; G06F 16/00; G06F 17/30; G06F 17/5095; G07C 5/008; G07C 5/0808; G06K 9/627; G06K 9/3241; G06K 9/00671; G06K 7/1443; G06Q 10/10; G06Q 10/20; G06Q 10/0635; G06Q 40/08; G06Q 20/4016; G06N 20/00; G06N 3/08; G06N 3/049; G06N 99/005; G01C 21/3682; G06T 7/0004; G06T 19/00; G06T 7/70; B60R 11/104; H04N 5/45

See application file for complete search history.

(56) References Cited

U.S. PATENT DOCUMENTS

| 5,557,515 | A | * | 9/1996 | Abbruzzese | ..... G06Q 10/06311 |
| | | | | | 705/7.15 |
| 8,917,437 | B2 | * | 12/2014 | Baur | ....................... B60R 1/082 |
| | | | | | 359/267 |
| 9,505,494 | B1 | * | 11/2016 | Marlow | ................. B64C 39/024 |
| 9,824,453 | B1 | * | 11/2017 | Collins | .................. G06Q 40/08 |
| 10,134,278 | B1 | * | 11/2018 | Konrardy | .......... G08G 1/096791 |
| 10,332,209 | B1 | * | 6/2019 | Brandmaier | ........... G06Q 40/06 |
| 10,380,694 | B1 | * | 8/2019 | Grant | .................... G06Q 50/265 |
| 10,565,874 | B1 | * | 2/2020 | Lei | .......................... H04W 4/44 |
| 10,628,456 | B2 | * | 4/2020 | Beznos | ................. G06F 16/254 |
| 2009/0018859 | A1 | * | 1/2009 | Purifoy | .................. G06Q 10/10 |
| | | | | | 705/305 |

(Continued)

*Primary Examiner* — Anh Ly
(74) *Attorney, Agent, or Firm* — Banner & Witcoff, Ltd.

(57) ABSTRACT

Aspects described herein may allow an automated generation of an interactive multimedia content with annotations showing vehicle damage. In one method, a server may receive vehicle-specific identifying information of a vehicle. Image sensors may capture multimedia content showing aspects associated with exterior regions of the vehicle, and may send the multimedia content to the server. For each of the exterior regions of the vehicle, the server may determine, using a trained classification model, instances of damage. Furthermore, the server may generate an interactive multimedia content that shows images with annotations indicating instances of damage. The interactive multimedia content may be displayed via a user interface.

18 Claims, 7 Drawing Sheets

(56) References Cited

U.S. PATENT DOCUMENTS

| | | | | |
|---|---|---|---|---|
| 2010/0250289 A1* | 9/2010 | Weaver | ............... | G06Q 10/087 |
| | | | | 705/4 |
| 2012/0109660 A1* | 5/2012 | Xu | ........................ | G06Q 10/06 |
| | | | | 705/1.1 |
| 2018/0300576 A1* | 10/2018 | Dalyac | ................. | G06K 9/6263 |
| 2019/0095877 A1* | 3/2019 | Li | ..................... | G06K 9/00771 |
| 2019/0210548 A1* | 7/2019 | Levy | .................... | G08G 1/0112 |

* cited by examiner

AUTOMATIC ANNOTATION FOR VEHICLE DAMAGE

FIELD OF USE

Aspects of the disclosure relate generally to electronic devices. More specifically, aspects of the disclosure may provide for systems and methods for automatic annotation for vehicle damage.

BACKGROUND

Auto dealerships today may typically post photos of vehicles online for sale, rent, or other leasing arrangements. When potential buyers, renters, or lessors (collectively referred to as "users") are viewing inventory of these vehicles online, it may be difficult for the users to identify existing damages on or within the vehicles. If the user undertakes the burden to physically drive to the location of the vehicle with the intent of the buying, renting, or leasing the vehicle, seeing existing damage (often for the first time) on the vehicle may create a negative experience for the user. There is thus a desire for a reliable means for identifying and presenting existing damage of vehicles. Systems and methods are presented to overcome one or more of the shortcomings presented above.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein may allow a user to view an interactive multimedia content online of a vehicle for sale, rent, or other leasing arrangement. The interactive multimedia content may have annotations to indicate instances of damage to the vehicle, thereby informing the user in advance and enhancing the online experience of the user.

These and other aspects of the present disclosure may provide various benefits to the auto dealers, prospective customers, and the vehicle industry. For example, systems and methods that facilitate a user to test drive a desired vehicle without an employee to be present may allow auto dealers to cut costs and unnecessary time and labor. Furthermore, these systems and methods may enhance a user's experience by allowing the user to directly test drive the desired vehicle without having to deal with constraints or restrictions presented by an auto dealer. Even further, these systems and methods may provide automatic tracking of vehicle test drives, thereby assuring safety.

According to some aspects, these and other benefits may be achieved by a staging area with associated instruments and devices (e.g., a staging area system) to capture multimedia content of a vehicle. A computing system or server located remotely or locally to the staging area system may facilitate automatic annotation for vehicle damage with limited human interaction. For example, in at least one implementation, the server may receive vehicle-specific identifying information of a vehicle. Image sensors at the staging area system may capture multimedia content showing aspects associated with exterior regions of the vehicle, and may send the multimedia content to the server. For each of the exterior regions of the vehicle, the server may determine, using a trained classification model, instances of damage. Furthermore, the server may generate an interactive multimedia content that shows images with annotations indicating instances of damage. The interactive multimedia content may be displayed via a user interface and responsive to a request.

Corresponding apparatus, systems, and computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
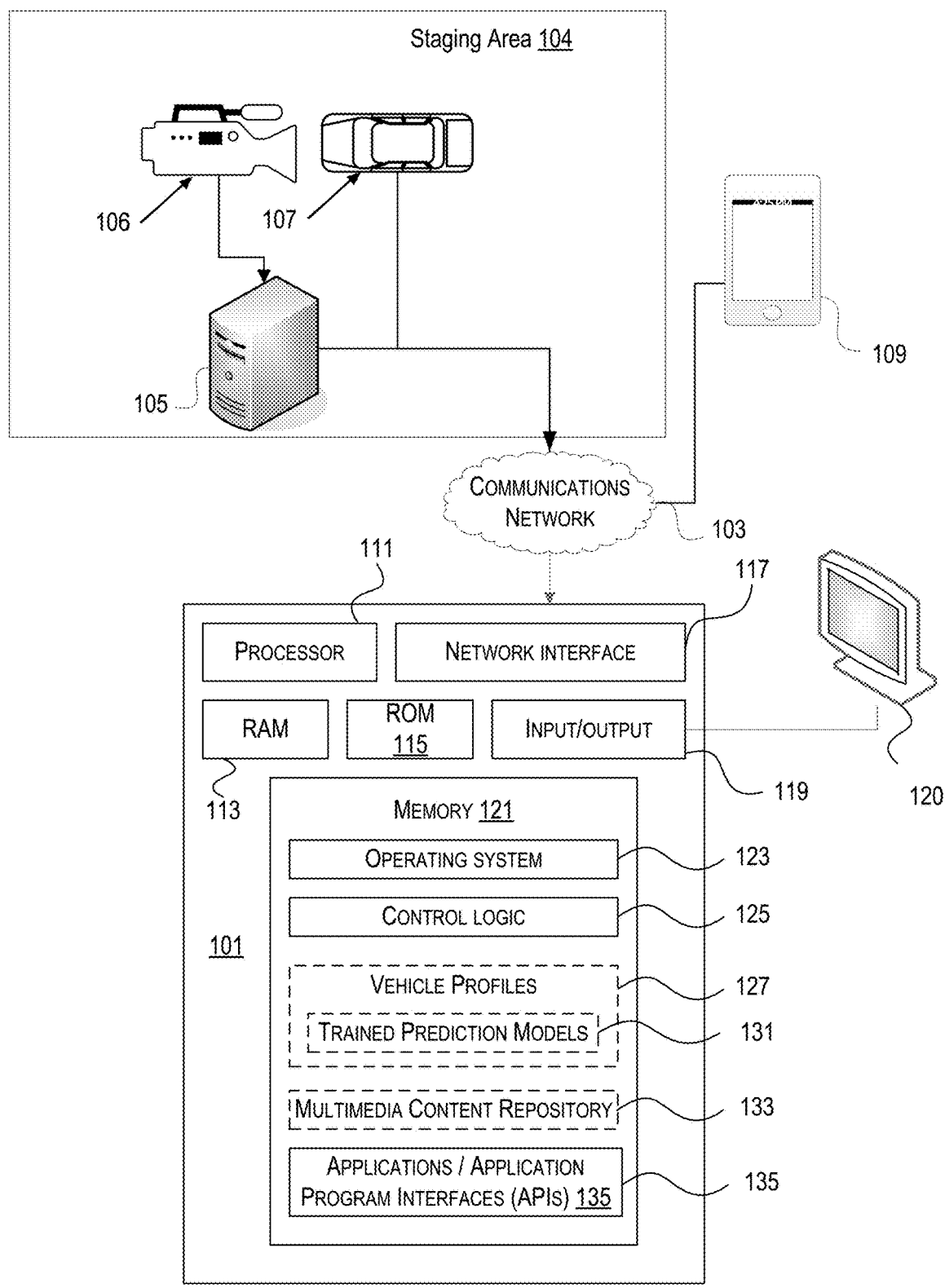
FIG. 1 depicts an example of a computing device that may be used in implementing one or more aspects of the disclosure in accordance with one or more illustrative aspects discussed herein.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to systems, methods, techniques, apparatuses, and non-transitory computer readable media for automatic annotation for vehicle damage. For example, information about a vehicle for sale, rent, or other leasing arrangement may be presented online and/or via a mobile application for a user to access via a user device. Instruments (e.g., image sensors, cameras, etc.) at a staging area may initially (e.g., before the vehicle is presented for the sale, rent, or other leasing arrangement) and/or periodically generate multimedia content (e.g., images) of the vehicle. A server, located locally or remotely to the staging area, may assess the generated multimedia content for any indications of damage to the vehicle. The server may generate an interactive multimedia content of the vehicle, with annotations for any indications of damage to the vehicle, for the user to access via the user device. An interactive multimedia content may comprise, for example, a set of multimedia content (e.g., one or more images, one or more videos, etc.) that may be capable of being adjusted and/or modified via user input. For example, an interactive multimedia content may include a 360 degree image of a vehicle, and a user may be able to zoom in, zoom out, and/or view various perspectives of the 360 degree image by rotating the image via user input. The interactive multimedia content generated by the server may rely on multimedia content generated by instruments at the staging area but the interactive multimedia content may nevertheless be distinguishable from the multimedia content. For example, the interactive multimedia content may be based on an analysis of the multimedia content and may include annotations to indicate instances of damage to the vehicle. The server, user device, vehicle systems, and/or any devices at the staging area may be examples of one or more computing devices. As discussed further herein, this combination of features may facilitate an automatic annotation for vehicle damage.

Before discussing these concepts in greater detail, however, several examples of a computing device that may be used in implementing and/or otherwise providing various aspects of the disclosure will first be discussed with respect to FIG. 1.

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device. Furthermore, while computing device 101 is shown to be separate from devices 105, 107, and 109, one or more components and one or more functions of computing device 101 may also be attributed to devices 105, 107, and 109.

Computing device 101 may, in some embodiments, operate in a standalone environment. In others, computing device 101 may operate in a networked environment. As shown in FIG. 1, various network nodes 101, 105, 107, and 109 may be interconnected via a network 103, such as the Internet. The various network nodes may include for example, a user device 109 associated with a user that views an interactive multimedia content of a vehicle, a computing device associated with a staging area 104 ("staging area system" 105), where multimedia content of the vehicle is generated via instruments 106 and an example computing device 101 that may represent a server that performs an automatic annotation for vehicle damage, and which may include components and functions shared by the other devices. Furthermore, the vehicle may comprise a device 107 (e.g., a telematics system) that may be used in one or more aspects described herein. Other networks may also or alternatively be used, including private intranets, corporate networks, LANs, wireless networks, personal area networks (PAN), and the like. Communications network 103 is for illustration purposes and may be replaced with fewer or additional computer networks. A local area network (LAN) may have one or more of any known LAN topology and may use one or more of a variety of different protocols, such as Ethernet. Devices 101, 105, 107, 109 and other devices (not shown) may be connected to one or more of the networks via twisted pair wires, coaxial cable, fiber optics, radio waves or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations assessing multimedia content associated with a vehicle, determining instances of damage to one or more aspects of the vehicle, generating interactive multimedia content with annotations showing the instances of damage, and other functions. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein. Furthermore, memory 121 may store various databases and applications depending on the particular use. For example, if the computing device 101 is a server used for the automatic annotation for vehicle damage, the memory 121 may include a database for vehicle profiles (e.g., "vehicle profiles" 127), and a repository of multimedia content generated for a plurality of vehicles (e.g., "multimedia content repository" 133). Vehicle profiles 127 may store information and tools that are specific to a vehicle profile (e.g., a category of vehicles based on their manufacture, model, class, vehicle type, etc.). These tools may include, for example, trained prediction models 131 (e.g., trained machine learning algorithms, trained classification models, etc.) that have been trained based on reference training data (e.g., multimedia content of a plurality of reference vehicles). For example, a trained prediction model may identify an aspect of a vehicle belonging to a vehicle profile using multimedia content associated with the vehicle, and another trained prediction model may determine instances of damage to one or more aspects of a vehicle belonging to a vehicle profile using multimedia content associated with the vehicle. The vehicle profiles 127, trained prediction models 131, and multimedia content repository 133 are shown in dotted lines to indicate its specific relevance to a computing device 101 of a server for automatic annotation for vehicle damage.

One or more applications and/or application program interfaces (API) 135 may also be stored in the memory of the computing device 101. For example, if the computing device 101 is a user device 109 associated with a user, the computing device 101 may include an application that allows the user to browse vehicles for sale, rent, or other leasing arrangements, and view their interactive multimedia content. The user may browse vehicles through this application, and/or may search for vehicles belonging to various vehicle profiles. If the computing device 101 is a server performing an automatic annotation for vehicle damage, the computing device 101 may include APIs for generating the interactive multimedia content and assessing damages.

Control logic 125 may be incorporated in and/or may comprise a linking engine that updates, receives, and/or associates various information stored in the memory 121 (e.g., vehicle-specific identifying information, multimedia content, trained models for identifying aspects of a vehicle belonging to a vehicle profile, trained models for determining instances of damage for one or more aspects of a vehicle belonging to a vehicle profile etc.). In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QoS), etc. For example, devices 101, 105, 107, 109, and others may operate in concert to provide parallel computing features in support of the operation of control logic 125 and/or software 127.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Having discussed several examples of computing devices which may be used to implement some aspects as discussed further below, discussion will now turn to an illustrative environment and network for test driving vehicles with minimal human interaction.

Figure 2:
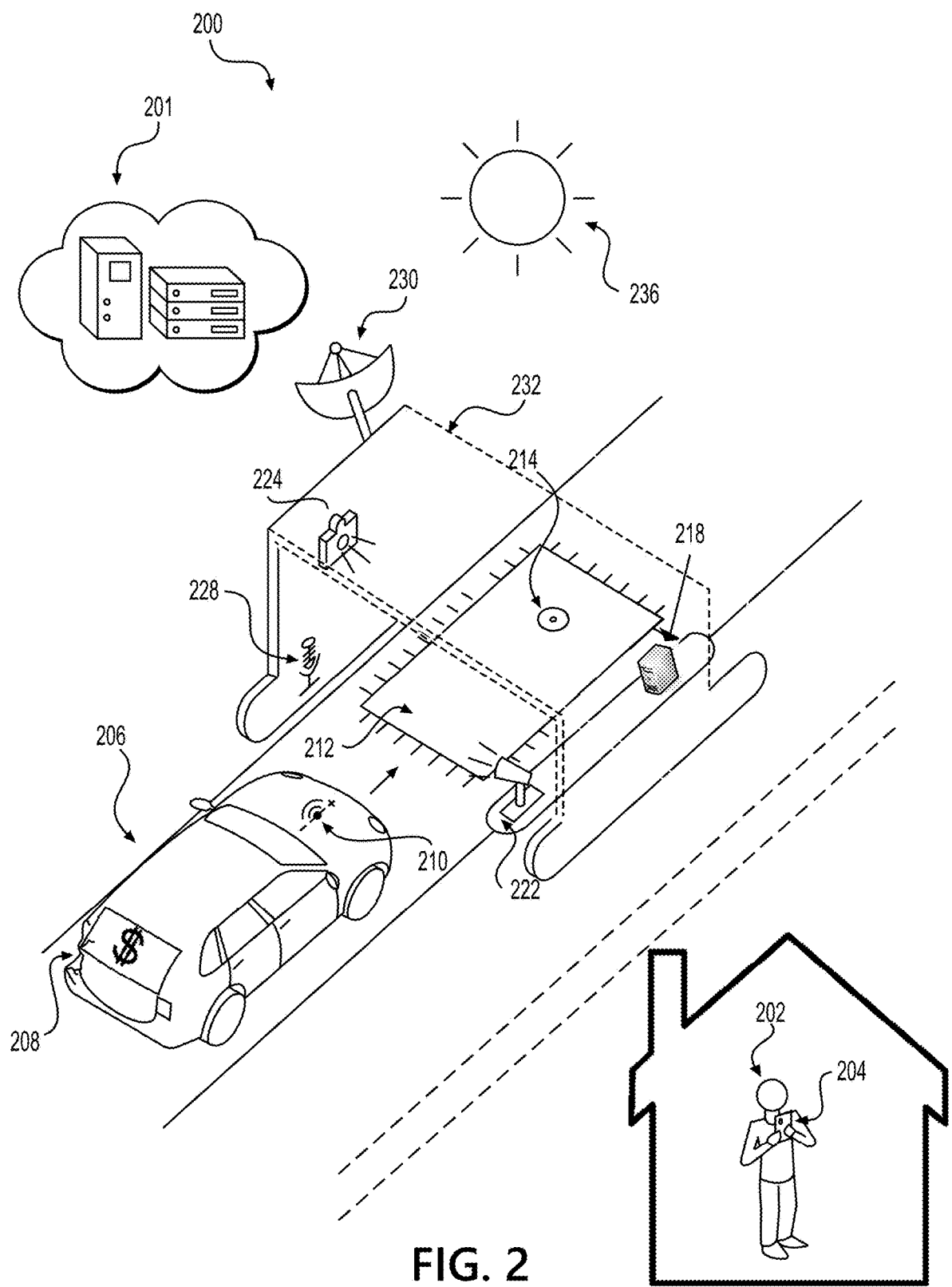
FIG. 2 depicts an example environment in accordance with one or more illustrative aspects discussed herein.

FIG. 2 depicts an example environment 200 in accordance with one or more illustrative aspects discussed herein. In at least one aspect, a user 202, via a mobile device 204, may be able to access and interact with an interactive multimedia content associated with a vehicle 210 and showing instances of damage to the vehicle. The interactive multimedia content, and the annotations of damage, may be generated by a server 201 with minimal human interaction. For example, an automobile dealership or other vendor may keep vehicles for sale, rent, or other purchase arrangements, and may advertise or promote these vehicles via an online marketplace, where interactive multimedia content associated with the vehicles may assist users in the online marketplace who are interested in knowing more about the vehicles.

The annotations to indicate instances of damage to the vehicle may be generated by determining the instances of damage via an examination of the vehicle. For example, vehicles, such as vehicle 206, may be routinely examined for damages (e.g., at the time of a test drive, sale, rent, or other purchase agreement). Thus, a vehicle being returned to an automobile dealership after a test-drive or short term rental may be examined for damages before it is placed in the market again. Also or alternatively, vehicles may be examined for damages when they are being onboarded for a trade-in, e.g., at a dealership. The onboarding of a vehicle may be performed to document damages, e.g., for a vehicle listing.

The vehicle 206 may be examined by being brought into a staging area 212. In various embodiments, a "staging area" may be used to refer to a predetermined area for the placement of a vehicle where instruments associated with the staging area can automatically generate multimedia content concerning various aspects of the vehicle. For example, as shown in FIG. 2, staging area 212 is a predetermined area for a vehicle to be placed so that various instruments (e.g., camera 224, sound recorder 228, etc.) can be better poised at obtaining data (e.g., photos, videos, recordings, etc.) of the vehicle 206. This generated multimedia content may be delivered to a server 201 over a communications network. For example, a communications module 230 near the staging area 212 may facilitate communication between the server 201 and the various instruments associated with the staging area 212. A "staging area system" may refer to the various instruments, devices, and/or computing systems associated with a staging area, collectively, or to a central device or computing system 218 that receives data obtained from the various instruments (e.g., as in staging area system 105 in FIG. 1). In some aspects the staging area system 218 may detect the placement or presence of a vehicle 206 via a vehicle detector 214 (e.g., motion detector, heat sensor, image sensor, etc.). Through this detection, the staging area system may deliver a feedback to the server 201 that a vehicle has entered the staging area 214. The instruments 224 and 228 may generate multimedia content (e.g., photos, videos, sound recordings, etc.) of the incoming or placed vehicle 206 and the multimedia content can be used to authenticate the vehicle. Furthermore, the instruments 224 and 228 may be used to generate further multimedia content of one or more aspects of the vehicle 206. In some implementations, the instruments 224 and 228, and/or sensor 214 may be aided by illumination provided by light sources (e.g., lamp 222). The light sources may be periodically adjusted or calibrated based on the level of sunlight 236. Furthermore, the staging area may be covered 232, e.g., to maintain consistency and reliability of generated multimedia content. In some aspects, the server 201 may also receive data that could indicate a damage to the vehicle 206 from a telematics system 210 of the vehicle 206. In some aspects, the vehicle system 107 described in relation to FIG. 1 may comprise the telematics system 210 of the vehicle 206 shown in FIG. 2. The data received from the telematics system 210 may be values (e.g., readings from one or more sensors within the vehicle) and/or may be presented as a form of multimedia content. For example, a data received from the telematics system may indicate that an oil filter is at 5%, or that a rear tire of the vehicle is only 30% inflated.

The server 201 may be a computing device or system located locally or remotely from the staging area 212 and may comprise one or more components of, and perform one or more functions described for, computing device 101 in FIG. 1. As will be described further below, in relation to FIGS. 4, 6 and 7, the server 201 may receive multimedia content generated by the staging area system 218 and/or the telematics system 210. The server 201 may utilize trained models to identify various aspects of the vehicle 206 and determine any instances of damage. The server 201 may generate an interactive multimedia content with annotations to indicate the instances of damage. A user 202, who may be located remotely from the vehicle 206, may access and interact with the interactive multimedia content via his or her user device 204 (e.g., as in user device 109 of FIG. 1). The user 202 may use the interactive multimedia content to learn more about vehicle 206, e.g., to make a decision of whether or not to purchase the vehicle for sale, rent, or other leasing arrangement. The interactive multimedia content may enhance the user's experience in purchasing, renting, or leasing the vehicle 206, by being made aware of damages to the vehicle in a reliable and accurate manner.

Figure 3:
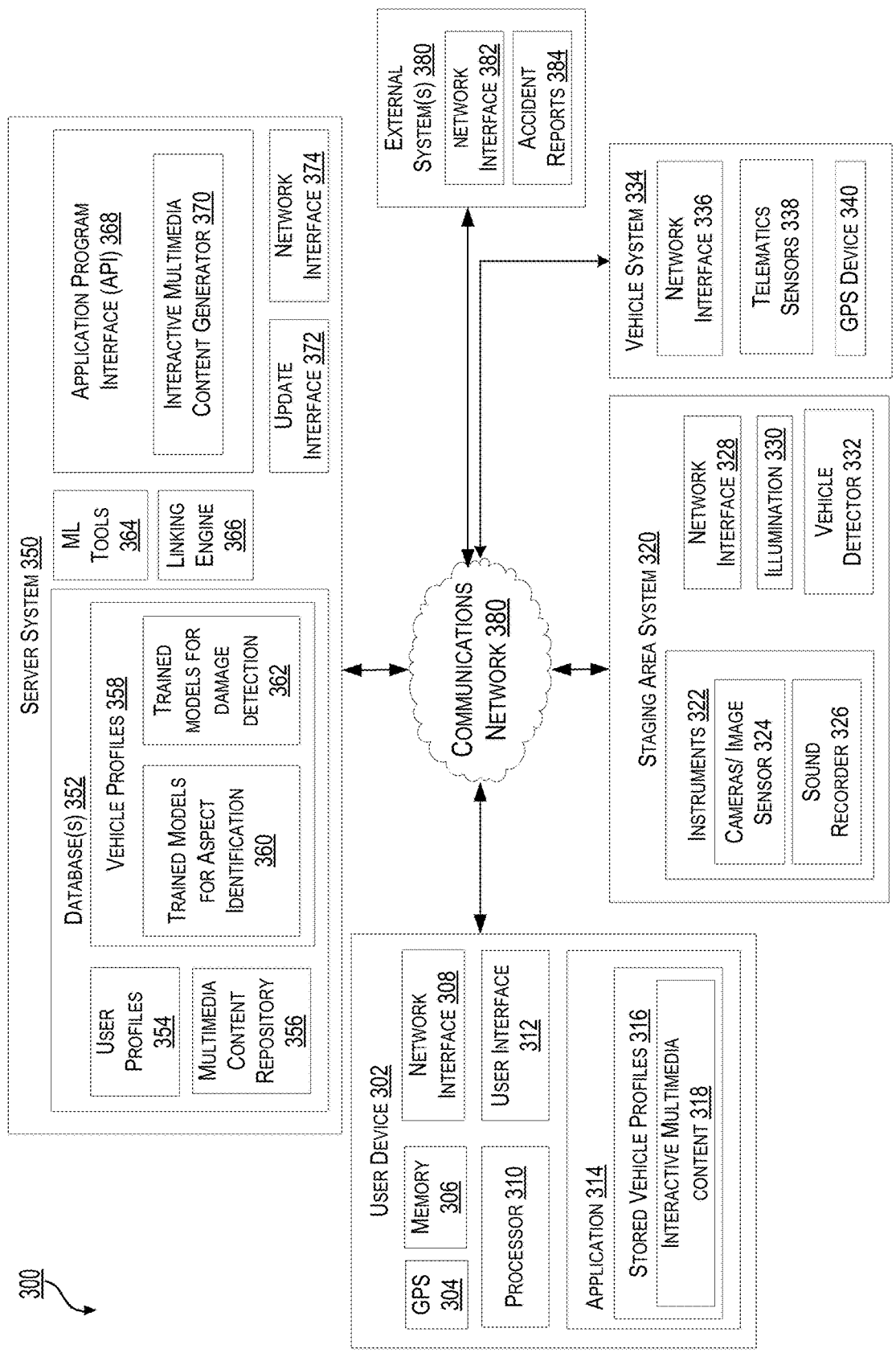
FIG. 3 depicts an example network in accordance with one or more illustrative aspects discussed herein.

FIG. 3 depicts an example network 300 in accordance with one or more illustrative aspects discussed herein. Each component or subcomponent shown in FIG. 3 may be implemented in hardware, software, or a combination of the two. Additionally, each component or subcomponent may include a computing device (or system) having some or all of the structural components described above for computing device 101. At a high level, the network 300 may include, for example, one or more user devices (e.g., user device 302) associated with different users, one or more staging area systems (e.g., staging area system 320), one or more vehicle systems (e.g., vehicle system 334), and one or more server systems (e.g., server system 352). The user device 302 may comprise a mobile phone (e.g., a smartphone), personal computer, tablet computer, laptop, or the like, which may include at least some of the features described herein. The user device 302 may belong to a user that accesses an online market for the sale, rent, or other leasing arrangement of vehicles, and may access and interact with interactive multimedia content associated with vehicles. The interactive multimedia content may present visual information (e.g., images, 3-D scan, etc.) pertaining to a vehicle and may be annotated to indicate any instances of damage. The annotations to indicate damage, and the generation of the interactive multimedia content may be performed by the server system 350. Furthermore, the server system 350 may generate the interactive multimedia content of a vehicle and may generate annotations for damage to the vehicle based on multimedia content of the vehicle that the server system 350 received from the staging area system 320, and may be based on data received from the vehicle system 334. The staging area system 320 may generate the multimedia content of the vehicle and send the generated multimedia content to the server system 350 over a communications network 380. Furthermore, the vehicle system 334 may receive data pertaining to the vehicle (e.g., via various telematics sensors 338), and send the data to the server system 350 over the communications network 380. The server system 350 may use the received multimedia content and/or data to determine any instances of damage to one or more aspects of the vehicle, and generate an interactive multimedia content of the vehicle with annotations to indicate any damage to the vehicle.

According to some aspects of the disclosure described herein, the user device 302 may comprise one or more components or features described below. The user device 302 may be an example of device 109 shown in FIG. 1, and/or an example of user device 204. The user device may be able to form wired and/or wireless data connections with one or more components of the server system 350 (e.g., as described further below) via an internet and/or other telecommunications network (e.g., communications network 380), using network interface 308. The user device 302 may include a global positioning system (GPS) 304 (or other location sensor) that could be used, e.g., by other systems, to track the location of the user device 302 and recommend nearby vehicles for sale, rent, or other leasing arrangements on the online marketplace. The user device may also comprise a memory 306 and a processor 310 that may perform functions similar to memory 121 and processor 111 of computing device 101 shown in FIG. 1. For example, the memory 306 of the user device 302 may store user-specific identifying information and financial information that can be accessed by or sent to the server system 350, e.g., as metadata. In some aspects, the memory store and run various aspects of the application 314.

The user interface 314 may be a display coupled with input devices (e.g., keyboard, type pad, touch screen, mouse, buttons, icons, microphone, sensors, etc.) that allows a user to access and browse listings of vehicles for sale, rent, or other lease arrangement on an online marketplace. As used herein, an online marketplace may refer to any type of electronic platform (e.g., an e-commerce site) where products (e.g., vehicles) and/or services (e.g., rental agreements, test-drive agreements, etc.) are promoted, advertised, and/or or offered. In some aspects, the online marketplace may facilitate a financial transaction for a user to procure a promoted, advertised, and/or offered product and/or service. The online marketplace may be hosted by the server system 350 and/or by an external system that is communicatively coupled to the server system 350. In some aspects, the online marketplace may be accessible to the user via an application 314 on the user device. The user interface 312 may further allow the user to access, view, and interact with an interactive multimedia content of a desired vehicle (e.g., interactive multimedia content 318), including annotations that indicate any instances of damage to one or more aspects of the desired vehicle. Each vehicle listed in the online marketplace may have its own interactive multimedia content generated according to methods presented herein. As discussed previously, an interactive multimedia content may comprise, for example, a set of multimedia content (e.g., one or more images, one or more videos, etc.) that may be capable of being adjusted and/or modified via user input. For example, an interactive multimedia content may include a 360 degree image of a vehicle, and a user may be able to zoom in, zoom out, and/or view various perspectives of the 360 degree image by rotating the image via user input.

The user device 302 may also run programs or applications 314, which may be stored in the memory 306, and which may be accessed via the user interface 314. One application or program may enable a user to use the online marketplace for browsing vehicles listed for sale, rent, or other leasing arrangements. A user may bookmark or otherwise indicate preferences for a vehicle profile when browsing or searching vehicles. The bookmarked vehicle profiles or preferences for the vehicle profiles may be saved, e.g., as stored vehicle profiles 316. In various embodiments, a vehicle profile may be a category of vehicles based on their manufacture, model, class, vehicle type, etc. The same or another application may allow the user to view and interact with an interactive multimedia content of a desired vehicle (e.g., interactive multimedia content 318). The interactive multimedia content 318 of various vehicles may be downloaded and/or saved to the user device and may include annotations that indicate any instances of damage to one or more aspects of the vehicle. The above described applications 314 or programs may be provided to the user device or hosted by the server system 350 (e.g., via an application program interface (API) 368).

The staging area system 320 may include one or more devices, instruments, and/or sensors at, adjacent to, or associated with a staging area of a vehicle. The staging area system 320 may include one or more of the features and components described below, and may be an example of staging area system 105 shown in FIG. 1 and staging area system 218 shown in FIG. 2. The staging area system 320 may include various instruments, sensors and devices configured to: generate multimedia content that capture physical data of the vehicle parked in the staging area at, adjacent to, or associated with the staging area system 318; track the entry, exit, and presence of vehicles (e.g., via vehicle detector 332); calibrate or adjust the conditions for the generation of multimedia content (e.g., via illumination devices 330 that may calibrate based on sunlight), and/or transmit sensor data to the server system 350 over the communications network 380. For example, the staging area system 320 may include instruments 322 that may include built-in or affixed cameras and/or image sensors 324. The cameras and/or image sensors 324 may be used to generate images, videos, and/or audio visual content of an aspect of the vehicle (e.g., an exterior or interior region of the vehicle). The cameras and/or image sensors 324 may be placed at various angles facing the staging area or vehicle, or at various locations near or at the staging area, e.g., to capture different aspects of the vehicle. For example, a camera at the base (e.g., ground) of the staging area may be used to generate multimedia content that could show whether the vehicle has any leakage issues. In another example, a camera hovering above the staging area may be used to generate image and/or video content that reveal any issues to the top exterior of the vehicle. The instruments 322 may further include sound recorders 326 to generate audio content of an aspect of the vehicle (e.g., engine performance, engine issues, cable issues, etc.). The sound recorders 326 may be able to capture sound recordings of a vehicle while the vehicle is kept running or an operator of the vehicle is performing a prescribed function. The images, videos, and/or audio generated by the various instruments 322 may be collectively referred to as "multimedia content" for simplicity. The multimedia content generated from the instruments 322 may be sent to the server system 350 over the communications network 380. However, the multimedia content generated by the various instruments 322 and sent to the server system 350 may be distinguishable from the interactive multimedia content generated by the server system 350. For example, the interactive multimedia content may include annotations to indicate one or more instances of damage to a vehicle, and these damages may be based on the conditions of various aspects of the vehicle.

As used herein, an aspect of a vehicle may refer to one or more of: an exterior or interior region, an electrical and/or mechanical component of the vehicle, or a performance of the vehicle. An aspect of a vehicle may be susceptible to damage (e.g., dents, leakages, wear and tear, etc.). A condition or state of an aspect of a vehicle may be ascertained through a multimedia content (e.g., image, audio, video, etc.) capturing physical data pertaining to the aspect. Thus, physical information (e.g., images, sounds, etc.) captured from the multimedia content may indicate a condition of an aspect of the vehicle and may be analyzed by the server system 350 to detect any damage to the vehicle. In some aspects, the instruments 322 may generate and send digital data (e.g., image data) that the server system 350 may use to process and/or create interactive multimedia content. The staging area system 318 may comprise a network interface 328 to establish wireless, wired, or network connections with one or more other systems (e.g., the server system 350, the vehicle systems 334, etc.)

The vehicle system 334 may include one or more devices, computing systems, circuitry or sensors that are interior to, exterior to, or otherwise associated with a vehicle. For example, the vehicle system 334 may include a telematics system 210, as shown in FIG. 2. The vehicle system 334 may include one or more of the features and components described below, according to some aspects of the present disclosure, and may be an example vehicle system 107 shown in FIG. 1 and vehicle system 210 shown in FIG. 2. For example, the vehicle system 334 may include various sensors configured to capture a condition of an aspect of the vehicle (e.g., telematics sensors 338) or collect locational or geographical information (e.g., GPS device 340). The telematics sensors 338 may compile the data captured by various sensors measuring or assessing the performance of various aspects of the vehicle. The location sensor (e.g., a global positioning service (GPS)) 340 may capture and present a location of the vehicle. The location of the vehicle 334 may be used by the server system 350, e.g., in order to list vehicles close to a user device of a user viewing the online marketplace of vehicles for sale, rent, or other leasing arrangements. The telematics sensors 340 may further include, but are not limited to, an oil filter sensor, an odometer, a fuel tank sensor, a thermometer, a vehicle computer, or a voltage sensor. Vehicle computers may be accessed through an OBD2 port, Bluetooth capabilities, or the like. The vehicle computer may be used to access additional sensors (e.g., tire pressure monitoring systems) or vehicle information (e.g., engine codes). The server system 350 may use the readings or measurements obtained from these and other telematics sensors to detect damages or issues to the vehicle, and generate annotations to indicate such damages or issues in the generated interactive multimedia content of the vehicle. The vehicle system 334 may send information to or receive information from other systems (e.g., the mobile device 302, the staging area system 320, the server system 350, etc.) over the communications network 390, via network interface 336.

The server system 350 may comprise one or more remote, local, and/or connected computing systems or servers managing one or more functions of the above-described systems (e.g., the mobile device 302, the staging area system 320, the vehicle system 334, etc.) to facilitate methods and systems described herein. The server 350 may be connected to the staging area system 320 and/or may be located remotely from the staging area system 320. The server system 350 may be an example of computing device 101 shown in FIG. 1 and/or server 201 shown in FIG. 2. At a high level, the server system may comprise one or more databases 352, application program interfaces (APIs) 368, machine learning tools 364, a linking engine 366, an update interface 372, and a network interface 374. The update interface 372 and linking engine 366 may form a database management application, software, or plug-in that may be used to perform create, read, update, or destroy (CRUD) functions with respect to data stored in the one or more databases 352. For example, the linking engine 366 may be used to form associations or link suitable data from different databases together, and/or to create new data based on associations or linkages. The update interface 372 may be used to update databases (e.g., by adding or deleting) data stored in the one or more databases 352 based on instructions from other parts of the server system 350 (e.g., computer readable instructions stored in memory of an API) or information received from one or more external systems (e.g., the mobile device 302, the staging area system 320, the vehicle system 334, etc.). The server system 350 may send information to or receive information from the external systems over the communications network 390 via the network interface 374.

The server system 350 may include one or more databases described below. For example, the server system 350 may include a user profiles database 354, which store identifying or biographical information pertaining to a user (e.g., user profiles) and/or link the user to a user device. A user profile may be based on, or associated with, an identifier of the user device 302 of the user. The user profiles database 354 may store user preferences, favorites, and/or bookmarked listings of vehicles and/or vehicle profiles in the online marketplace. In some aspects, the user profiles database 354 may store financial information of the user intended to be used in transactions involving vehicles in the online marketplace.

The server system 350 may include a vehicle profiles database 358 for storing vehicle profiles. A vehicle profile may identify individual vehicles, e.g., by vehicle identification numbers, license plate numbers, and/or or other vehicle descriptors, based on a category of vehicles in which the individual vehicle falls under. The vehicle profiles database 358 may store information pertaining to one or more of a make, model, class, year of manufacture, color, type, or category of a vehicle. For example, the vehicle profiles database 358 may identify vehicles that online marketplace advertises, promotes, and/or offers for sale, rental, and/or other leasing arrangement.

As will be described further below, the vehicle profiles database 358 may also store programs and other tools that are specific to a category of vehicles (e.g., a vehicle profile). These programs may include, for example, trained models that identify an aspect of a vehicle (e.g., trained models for aspect identification 360). The trained models for aspect identification may identify an aspect (e.g., a region or part) of a vehicle from a multimedia content (e.g., an image) of the vehicle, based on the vehicle profile of the vehicle. Thus, the trained model could identify an image of a front of a 2019 TOYOTA COROLLA LE as being an image of the front exterior of the vehicle. The stored programs may also include trained models for detecting damage to one or more aspects of a vehicle (e.g., trained models for damage detection 362). The trained model may be specific to an aspect of the vehicle, and may detect damage from a multimedia content of the aspect of the vehicle. The trained models may be trained machine learning and/or classification models that have been trained based on reference data obtained, e.g., from externals systems or the multimedia content repository 356. Furthermore, ML tools 364 may be an application, program, or software used to train the described models from the reference data.

The sever system 352 may include a database for multimedia content collected from a plurality of vehicles (e.g., multimedia content repository 356). The multimedia content stored in the multimedia content repository 356 may include metadata that may reveal the time, date, and/or geographic location of the generation of the multimedia content. The multimedia content repository 356 may also identify a vehicle or vehicle profile to which a stored multimedia content pertains to, and may indicate the aspect of the vehicle that the multimedia content purports to represent. Furthermore, the multimedia content repository 356 may store multimedia content pertaining to a plurality of reference vehicles of a plurality of vehicle profiles, e.g., to train machine learning algorithms, classification models, and other learned or prediction models. The linking engine 366 may associate multimedia content stored in the multimedia content repository 356 to an individual vehicle and/or a vehicle profile indexed, for example, in the vehicle profiles database 358.

The server system 350 may include one or more APIs (e.g., as described below). The server system 350 may include, e.g., an API for an application for generating an interactive multimedia content (e.g., interactive multimedia content generator 370). The server system 350 may include an API for detecting instances of damage to a vehicle and performing annotations to the interactive multimedia content based on the detected instances of damage (e.g., damage detection 371). The interactive multimedia content and the annotations for any instances of damage to the vehicle may be accessible to a user browsing the online marketplace via an application (e.g., application 314 on user device 302).

The above described network interfaces (e.g., network interface 308, network interface 328, network interface 336, and network interface 374) may comprise a wireless communications interface, such as a cellular connection (e.g., LTE, 5G), a Wi-Fi connection (e.g., Wi-Fi 5 or Wi-Fi 6). Furthermore, the above described network interfaces may be examples of network interface 117 shown in FIG. 1.

In some implementations, server system 350 may comprise more than one server delegated to perform different functions. For example, one server may manage financial transactions over the online marketplace of vehicles for sale, rent, or other leasing arrangements, whereas another server may generate interactive multimedia content of a vehicle with annotations to indicate instances of damage to a vehicle. Furthermore, one server may manage applications for viewing and interacting with the interactive multimedia content on the online marketplace, e.g., via the application program interface 368.

In some implementations, the example network 300 shown in FIG. 3 may receive data from external system(s) (e.g., of municipal offices, police departments, and/or government). For example, the server system 350 may receive accident reports of vehicles from the computing systems of municipal offices. These accident reports may include damage reports, describing, e.g., where damage may have occurred. The example network 300 may thus include the external system(s) 380. Each of the external system(s) 380 may also be accessible to one or more of the systems described previously over the communications network 380 via a network interface 382. The accident reports (e.g., accident reports 384) may be accessed from the external system(s) 380 and may be used by the API 368 of server system 350 to determine instances of damage to one or more aspects of a vehicle, and generate interactive multimedia content with annotations to reflect the instances of damage. For example, rather than just recognizing new or not previously captured instances of damage via routine inspection, the server system 350 may determine (e.g., after processing, parsing, and/or analyzing an accident report) areas of a vehicle where damage has been reported in the accident report. The server system 350 may instruct the staging area system 320 to capture multimedia content of those areas. The captured multimedia content may be used to illustrate the extent of the damage reported in the accident report or to determine that there may be a lack of visible damage, e.g., in order to improve customer expectations.

Figure 4:
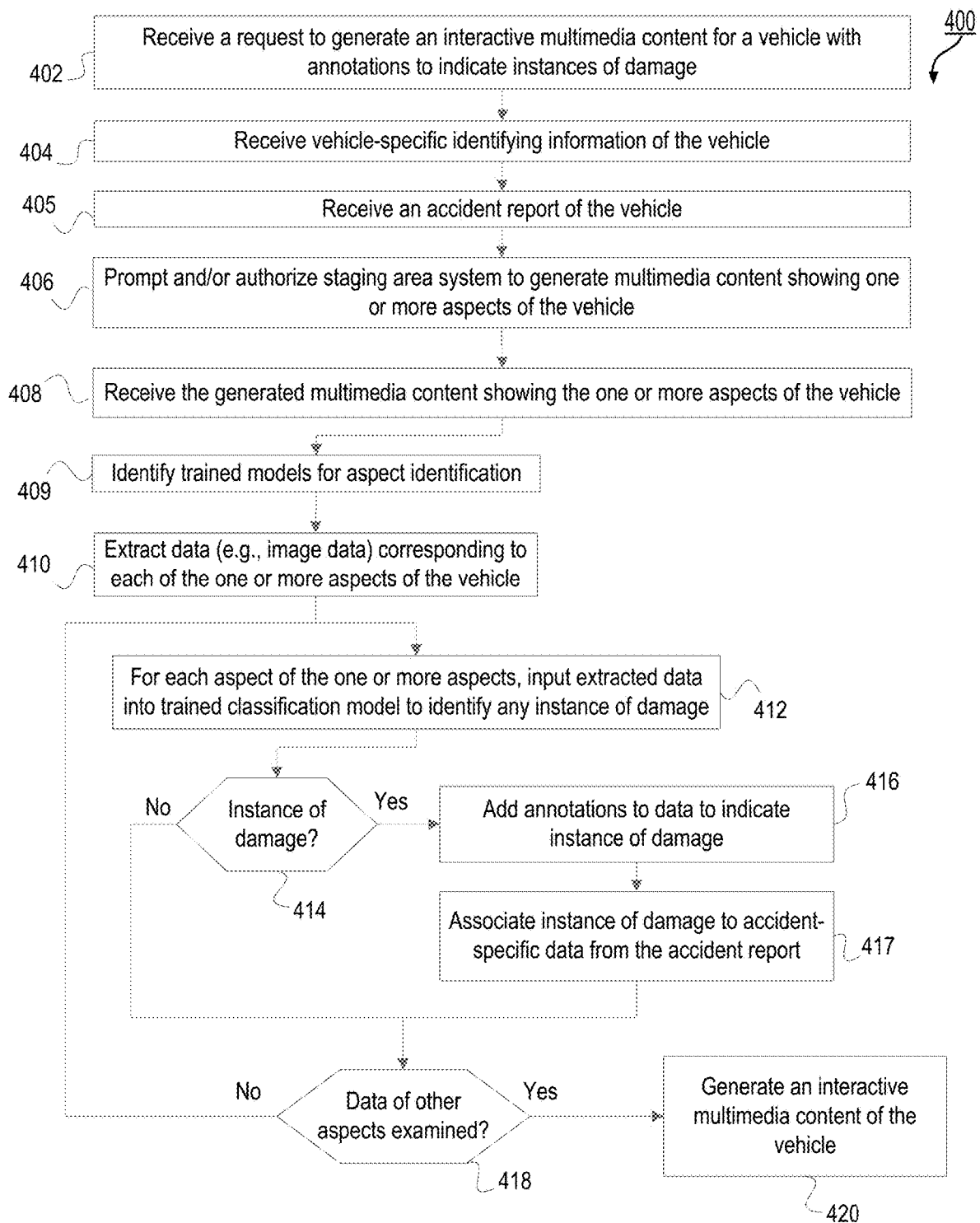
FIG. 4 depicts a flow diagram of an example method for automatically annotating vehicle damage and generating an interactive multimedia content, in accordance with one or more illustrative aspects discussed herein.

FIG. 4 depicts a flow diagram of an example method 400 for automatically annotating vehicle damage and generating an interactive multimedia content, in accordance with one or more illustrative aspects discussed herein. Method 400 may be performed by one or more components (e.g., processors) of server system 350 shown in FIG. 3, server 201 shown in FIG. 2, and/or computing device 101 shown in FIG. 1. For convenience, "server" may be used herein to identify the performer of one or more steps of method 400. As explained previously, a vehicle may be examined for instances of damage. The examination may be performed periodically (e.g., while the vehicle is advertised, promoted, or offered for sale, rent, or other leasing arrangement) or non-periodically (e.g., initially, before the vehicle is advertised, promoted, and/or offered for sale, rent, or other leasing arrangement). The examination may occur when a vehicle is brought to a staging area, where instruments, devices, and systems of a staging area system proceed to generate multimedia content. However, the generated multimedia content can be analyzed by the server to determine instances of damages to one or more aspects of the vehicle.

The server may begin operations of automatically annotating vehicle damage and generating an interactive multimedia content when it receives a request to do so (e.g., as in step 402). The request may be submitted, for example, by an operator of the vehicle, a seller or lessor of the vehicle, and/or an employee of an auto dealership. The request may be inputted into a device of the server, e.g., via update interface 372 of server system 350. In some aspects, the request may be automatic and may be received when a staging area system detects a vehicle (e.g., via vehicle detector 332 of the staging area system 320). At step 404, a server may receive vehicle-specific identifying information of a vehicle. In some aspects, the server may prompt the sender of the request in step 402 (e.g., an operator of the vehicle) for the vehicle-specific identifying information. Also or alternatively, the request received at step 402 may identify the vehicle for which the interactive multimedia content with the annotations is being sought. The identification of the vehicle may include information that the server may use to look up the vehicle profile of the vehicle, e.g., via the vehicle profile database 358 of the server system 350. Also or alternatively, generated multimedia content of the vehicle received in subsequent steps of method 400 may be used to automatically recognize vehicle-specific identifying information and/or the vehicle profile of the vehicle.

In some aspects, the server may use the vehicle-specific identifying information to retrieve accident reports of the vehicle (e.g., as in step 405). The accident reports may be retrieved from external systems (e.g., the external systems 380), such as the computing systems of municipal offices, police departments, or governmental agencies. Accident reports and other data pertaining to a vehicle may be saved at the server, e.g., within the vehicle profiles database 358 and indexed under a data structure assigned for the vehicle.

At step 406, the server may prompt and/or authorize a staging area system to generate multimedia content showing one or more aspects of the vehicle. For example, if the request to generate the interactive multimedia content and the annotations was automatically sent by the staging area system, the prompting in step 406 may allow the staging area system to send multimedia content to the server. An authorization may be an authentication of the vehicle as it is detected by the staging area system (e.g., via vehicle detector 332 of the staging area system 320). For example, the detected vehicle may be compared with the vehicle-specific identifying information received by the server to ensure that the vehicle that has entered the staging area system is the correct vehicle (e.g., the vehicle for which the request for interactive multimedia content with annotations to indicate instances of damage had been sent). As will be described in relation to method 500 shown in FIG. 5, the staging area system may cause its instruments to generate multimedia content following this authorization by the server.

At step 408, the server may receive the generated multimedia content showing the one or more aspects of the vehicle. For example, the generated multimedia content may be received from the staging area system 320 over communications network 380, and may be saved in the databases 352 (e.g., within multimedia content repository 356.). The linking engine 366 may associate each multimedia content file with the aspect of the vehicle it represents, as well as the vehicle profile of the vehicle it represents. The aspect represented by the multimedia content, and the vehicle profile of the vehicle associated with the multimedia content may be stored with the multimedia content, e.g., as metadata. As discussed previously, an aspect of a vehicle may refer to one or more of: an exterior or interior region, an electrical and/or mechanical component of the vehicle, or a performance of the vehicle. An aspect of a vehicle may be susceptible to damage (e.g., dents, leakages, wear and tear, etc.). A condition or state of an aspect of a vehicle may be ascertained through a multimedia content (e.g., image, audio, video, etc.) capturing physical data pertaining to the aspect. The generated multimedia content received from the staging area system may be for a multitude of aspects of the vehicle so as to ensure that the interactive multimedia content generated by the server shows annotations for damages to any of the aspects of the vehicle. Thus, an example of the generated multimedia content received by the server may include images of the front and rear exterior, side exterior, the top exterior, and the seats; an audio of the sound of the engine while the accelerator is pressed; and a video of the bottom of the vehicle, e.g., to capture any leaks in fluid.

At step 410, the server may extract data from the multimedia content (e.g., image data, video data, sound data, etc.), corresponding to each of the one or more aspects of the vehicle. For example, if the received multimedia content are images of the exterior of the vehicle, the server may crop out parts of the image that are of the background, partition the cropped image into the various portions of the exterior of the vehicle (e.g., front exterior, rear exterior, etc.) that correspond to one or more aspects of the vehicle, and obtain image data (e.g., pixels, base code, etc.) for each of the portions. The one or more aspects of the vehicle may be identified through mathematical models that are trained to recognize data pertaining to the one or more aspects of the vehicle. For example, as shown in step 409, the extraction of the data may be performed by identifying trained models for aspect identification based on the vehicle profile. The trained models may be specific to a vehicle profile, and may be stored in the server (e.g., as trained models for aspect identification 360 within the vehicle profile database 358 of server system 350). The vehicle profile of the vehicle may be determined from the vehicle-specific identifying information received in step 404. The training and application of these models for identifying one or more aspects from the received multimedia content, e.g., to extract data corresponding to the one or more aspects will be explained in further detail in relation to FIG. 7.

For each of the one or more aspects of the vehicle, the server may input its corresponding extracted data into a trained classification model to identify any instances of damage (e.g., as in step 412). The trained classification models may be machine learning algorithms trained to recognize damages from a data (e.g., image data) pertaining to an aspect of a vehicle. The training may involve learning from training data comprising reference data of an aspect of a vehicle showing one level of damage and reference data of the aspect of the vehicle showing another level of damage (e.g., no damage). The trained classification models may be specific to a vehicle profile, and/or may be specific to an aspect of a vehicle of a vehicle profile. Thus, the trained classification models may be stored in the server (e.g., as trained models for damage detection 362 stored within the vehicle profiles database 358 of server system 350). For example, a trained classification model for the front exterior of vehicles belonging to the vehicle profile of a 2019 TOYOTA COROLLA LE may recognize any instances of damage to front exterior of a vehicle that belongs to 2019 TOYOTA COROLLA LE vehicle profile. Thus, for each of the one or more aspects of the vehicle, the server may input the extracted data from the multimedia content corresponding to the aspect of the vehicle into the trained classification model corresponding to the aspect of the vehicle. More examples of the training and application of the classification models for identifying any instances of damage to an aspect of a vehicle may be explained in further detail in relation to FIG. 6.

For each of the one or more aspects of the vehicle, the trained classification model corresponding to the aspect of the vehicle may determine whether or not the aspect of the vehicle whose condition was captured by the multimedia content has any instance of damage (e.g., as in step 414). If there are no instances of damage, the server may determine whether the extracted data of other aspects of the vehicle are yet to be examined, e.g., are yet to be used in determining whether there are any instances of damage to the aspect of the vehicle that the extracted data represents. If there are extracted data of other aspects of the vehicle that are yet to be examined, step 412 may be repeated, e.g., by inputting the extracted data for each of the other aspects of the vehicle into the trained classification model corresponding to the other aspect of the vehicle.

If the server, via the trained classification model, determines that an aspect of the vehicle has an instance of damage, the server may add annotations to indicate the instance of damage to the aspect of the vehicle. The added annotations may be data added to the extracted data (e.g., making enhancements to the image data) that would cause the resulting data to generate a multimedia content of the aspect of the vehicle with an annotation indicating the damage (e.g., an image of the aspect that is annotated to indicate information pertaining to a damage to the aspect). The annotation may include, for example, one or more of a label, an arrow, a link, a text (including a mouse over text), a visual display or symbol, etc. For example, if the data corresponding to an image of a front exterior of a vehicle showing a dent is base code that compiles to generate the image, the server may update the base code so that the resulting image generated by the updated base code shows an arrow pointing to the dent and a text indicating "dent."

In some aspects, metadata received along with the generated multimedia content in step 408 may be used in the annotation. For example, the annotation may indicate the time of damage, the first detection of the damage (e.g., when the timing of the generation of the multimedia content that captured the aspect of the vehicle showing the damage), the cause of the damage, any repair or maintenance associated with the damage, etc.

In some aspects, e.g., where the server has an accident report of the vehicle, the server may associate the instance of damage (detected in step 414) to accident-specific data from the accident report. For example, if the server has detected damage to the front exterior to the vehicle based on image data of the front exterior indicating an instance of damage, the server may electronically process the accident report (e.g., via word recognition for "front," and/or "exterior") to obtain accident-specific data. The accident-specific data may indicate, for example, a cause or source of the damage, a timing of the damage, a location of the damage, cost of the damage, repairs or maintenance associated with the damage, etc. The accident-specific data may be used in the annotation added to the data of the multimedia content for the aspect of the vehicle having the damage.

After the server has added the annotation to the data of the multimedia content for the given aspect of the vehicle, the server may, at step 418, determine whether the extracted data of other aspects of the vehicle are yet to be examined, e.g., are yet to be used in the trained classification models to determine whether there are any instances of damage to the aspect of the vehicle that the extracted data represents. If there are extracted data of other aspects of the vehicle that are yet to be examined, steps 412, 414, 416, and/or 417 may be repeated until all or at least a predetermined number of aspects of the vehicle have been examined for damages.

If the extracted data of all or at least a predetermined number of aspects of the vehicle have been examined for damages (e.g., step 418=Yes), then the server may, at step 420, generate an interactive multimedia content of the vehicle. The interactive multimedia content may display multimedia content for one or more aspects of the vehicle (which may overlap with the one or more aspects for which generated multimedia content was received in step 408). Furthermore, the interactive multimedia content may include the annotations (as added in step 416) to indicate instances of damage to the one or more aspects of the vehicle. The interactive multimedia content and/or the annotations may be accessible to a user (e.g., user 202) of the online marketplace of vehicles for sale, rent, or other leasing arrangements. The user may access the interactive multimedia content of the vehicle through his or her user device (e.g., device 109, user device 202, and/or user device 302). For example, while the user is browsing vehicles on the online marketplace on his or her user device, the user may desire to know more about one of the vehicles listed in the online marketplace, and may access the interactive multimedia content to learn more. The user may discover, by viewing and interacting with the interactive multimedia content associated with the vehicle, of damages to one or more aspects of the vehicle. Furthermore, the user may learn more about the damages by reading and/or viewing the annotations. The user may be able to adjust the interactive multimedia content (e.g., by zooming, rotating, etc.) and may be able to shift through details and annotations for each of the one or more aspects of the vehicle using a user interface (e.g., user interface 312 of the user device 302). In some aspects, where the server manages applications for presenting the interactive multimedia content of vehicles and/or manages the online marketplace, the server may update the application by deploying the interactive multimedia content (e.g., via the API 368 of the server system 350).

Figure 5:
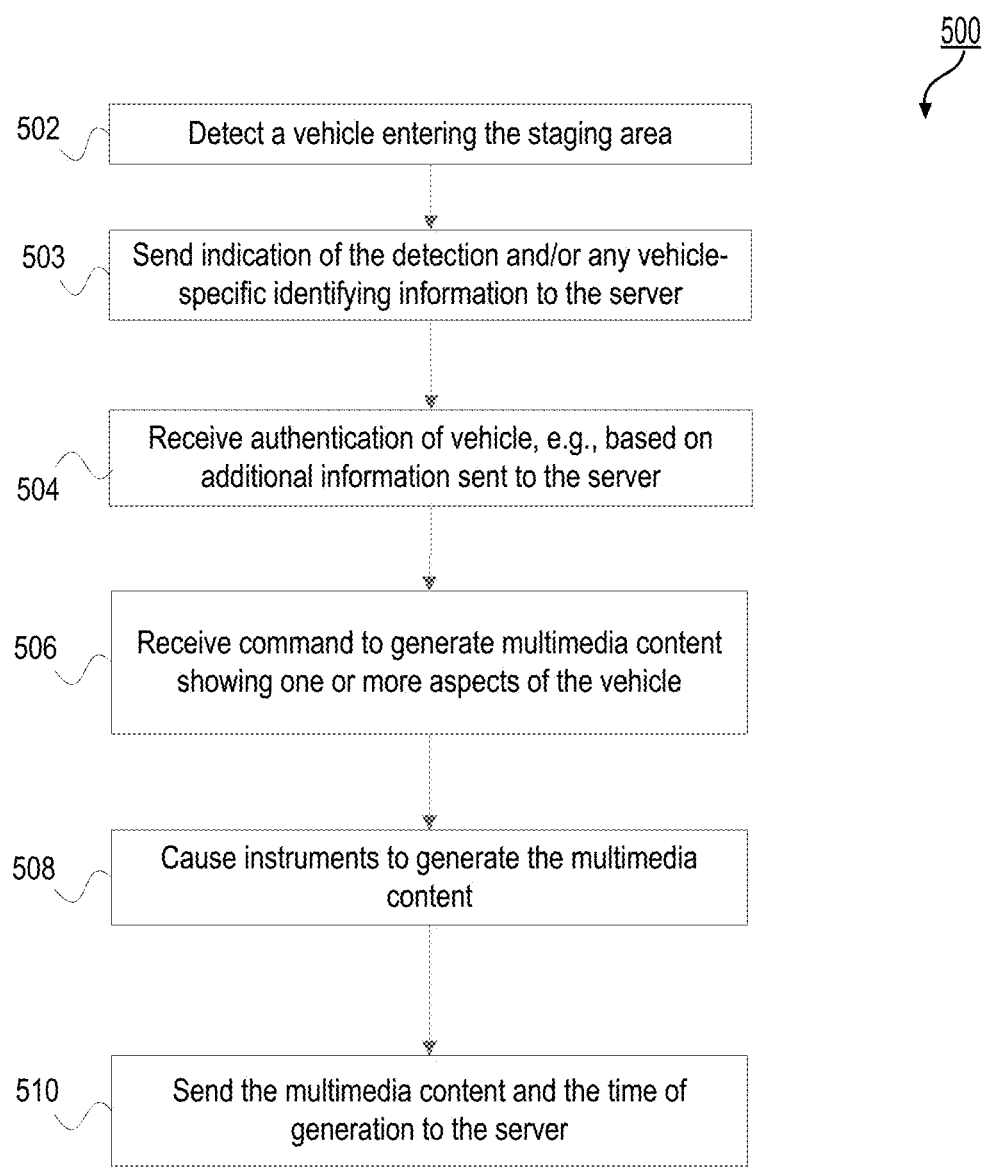
FIG. 5 depicts a flow diagram of an example method for facilitating automatic annotation for vehicle damage, in accordance with one or more illustrative aspects discussed herein.

FIG. 5 depicts a flow diagram of an example method 500 for facilitating automatic annotation for vehicle damage, in accordance with one or more illustrative aspects discussed herein. Method 500 may be performed by one or more components (e.g., processors) of the staging area system 320 shown in FIG. 3, staging area system 218 shown in FIG. 2, and/or device 105 shown in FIG. 1. For convenience, "staging area system" may be used herein to identify the performer of one or more steps of method 500. Furthermore the staging area system may be associated with a staging area (e.g., staging area 212 as shown in FIG. 2) and may send and receive communications with the server in method 400 (e.g., server system 350 shown in FIG. 3, server 201 shown in FIG. 2, and/or computing device 101 shown in FIG. 1). Accordingly, "staging area" and "server" may be used when describing one or more steps of method 500, for convenience. As explained previously, a vehicle may be examined for instances of damage when the vehicle is brought to a staging area. Instruments, devices, and/or systems of the staging area system may proceed to generate and send multimedia content, according to one or more steps described herein. Furthermore, one or more steps of method 500 may be performed by the staging area system in parallel to, subsequent to, or prior to one or more steps of method 400 performed by the server.

At step 502, the staging area system may detect a vehicle entering, or situated in, the staging area (e.g., as in staging area 212 associated with the staging area system 218). The detection may be by way of a vehicle detector (e.g., vehicle detector 214 as shown in FIG. 2 and vehicle detector 332 as shown in FIG. 3). The vehicle detector may be a motion detector, heat sensor, and/or an image sensor that is able to sense the presence or entry of a vehicle. Through this detection, the staging area system may deliver a signal to the server (e.g., that a vehicle has entered the staging area). In addition to or as an alternative to the detection of the vehicle, a signal may be sent to the server (e g, manually by an operator of the vehicle) from the staging area system. In some aspects, the signal may be a request for an interactive multimedia content for the vehicle and/or a request to generate annotations indicating damages to one or more aspects of the vehicle, as previously discussed, with respect to step 402 of method 400.

At step 503, the staging area system may send an indication of the detection and/or any vehicle-specific identifying information of the vehicle. Also or alternatively, the signal sent at 502 may include the vehicle-specific identifying information of the vehicle. Furthermore, the vehicle-specific identifying information may be manually entered into the staging area system (e.g., via an input module at the staging area system). The vehicle-specific identifying information may include for example, one or more of, a vehicle identification number, a make or manufacturer of the vehicle, the class of the vehicle, a vehicle type, a year of manufacture of the vehicle, a color or other physical characteristic of the vehicle, a nameplate identification of the vehicle, and/or a driver license number associated with the vehicle. Also or alternatively, instruments associated with the staging area (e.g., the instruments 224 and 228) can generate multimedia content (e.g., photos, videos, sound recordings, etc.) of the incoming or placed vehicle and the multimedia content can be used to not only capture the condition of one or more aspects of the vehicle but also to initially detect the vehicle.

The staging area system may attempt to authenticate to confirm whether the vehicle detected in step 502 is a vehicle for which the interactive multimedia content and annotations has been requested from the server. For example, the server may attempt to match vehicle-specific identifying information of the vehicle (e.g., by an operator of the vehicle, a seller or lessor of the vehicle, an employee of an auto dealership, etc.) with additional information generated at the staging area system and sent to the server. The additional information may by requested by the server and may include, for example, an image or scan of a vehicle identification (e.g., VIN) displayed on the vehicle, an image or scan of a nameplate identification of the vehicle, and/or an image or scan of a defining feature of the vehicle that could be used to match vehicle-specific identifying information (e.g., a displayed logo or name of the vehicle manufacture and/or class). The staging area system may comply with such requests for additional information. Subsequently, the staging area system may receive an indication that the vehicle has been authenticated (e.g., as in step 504).

After the vehicle has been authenticated, the server may proceed to prompt or authorize the staging area system to generate multimedia content of one or more aspects of the vehicle (e.g., beginning with step 506). At step 506, the staging area system may receive a command to generate multimedia content showing the one or more aspects of the vehicle. An aspect of a vehicle, which may include, for example, an exterior or interior region, an electrical and/or mechanical component of the vehicle, or a performance of the vehicle, may be susceptible to damage (e.g., dents, leakages, wear and tear, etc.). The staging area system may be communicatively coupled to various instruments (e.g., instruments 224 and 228 as shown in FIG. 2, and instruments 322 as shown in FIG. 3) that could generate multimedia content that captures physical data of the one or more aspects of the vehicle. Based on the received command, the staging area system may cause the instruments to generate the multimedia content. For example, cameras located right above the vehicle may take photos of the top exterior region of the vehicle, while cameras located on the floor of the staging area may take videos of the bottom of the vehicle (e.g., to capture any leakages from the vehicle).

At step 510, the staging area system may then send the multimedia content to the server. Furthermore, the time of generation of the multimedia content and/or any other detail associated with the generation of the multimedia content (e.g., the instrument identification, location of the staging area, location of the instrument, aspect captured, etc.) may also be sent with the multimedia content to the server. As described previously in relation to method 400 of FIG. 4, the server may receive the generated multimedia content (along with the time of generation and/or any other metadata) to determine any instances of damages to the one or more aspects of the vehicle, and may generate interactive multimedia content of the vehicle with annotations to indicate the instances of damage.

Figure 6:
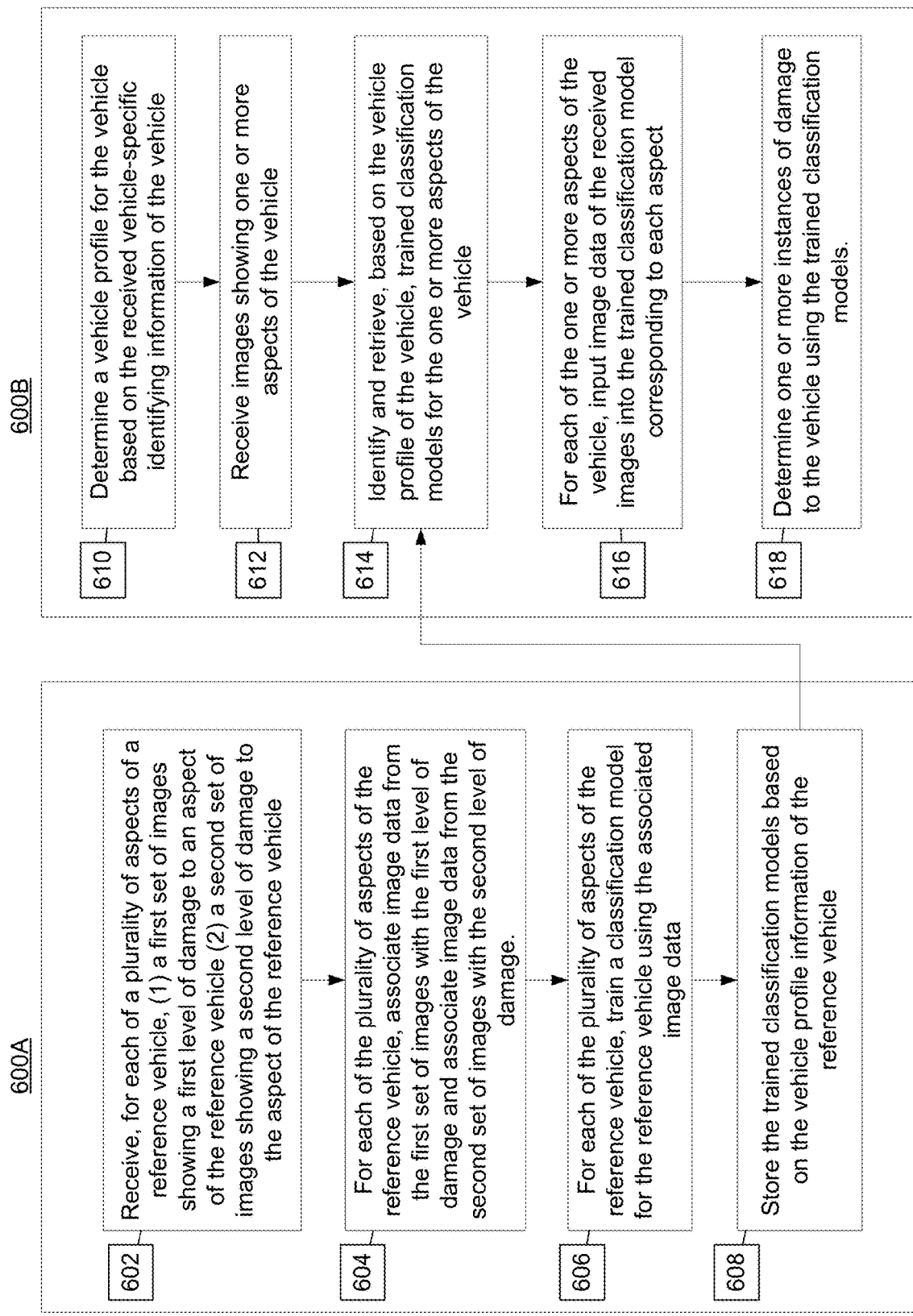
FIG. 6 depicts a flow diagram of an example method for training and applying a classification model to determine one or more instances of damage to a vehicle, in accordance with one or more illustrative aspects discussed herein.

FIG. 6 depicts a flow diagram of example methods for training a classification model (e.g., method 600A) and applying the classification model (e.g., method 600B) to determine one or more instances of damage to a vehicle, in accordance with one or more illustrative aspects discussed herein. Furthermore, FIG. 6 describes an example of one or more steps that may be performed prior to, in parallel to, or subsequent to step 412 of method 400, as shown in FIG. 4. Methods 600A (e.g., the training phase of the classification model) and 600B (e.g., the application phase of the classification model) may be performed by the server of method 400 (e.g., server system 350 shown in FIG. 3, server 201 shown in FIG. 2, and/or computing device 101 shown in FIG. 1). In some aspects, however, method 600A may be performed by an external system, and the resulting trained classification model may be provided to the server for use in method 600B. For convenience, "server" may be used herein to identify the performer of one or more steps of method 600B (e.g., the application phase), and "device" (which may or may not necessarily be the server) may be used herein to identify the performer of one or more steps of method 600A (e.g., the training phase). While image data is being used in methods 600A and 600B, it is contemplated that other forms of multimedia content data (e.g., audio data, video data, etc.) may additionally be used and/or may be substituted for the image data.

Method 600A may describe example steps for training classification models that are able to identify an instance of damage from multimedia content data corresponding to one or more aspects of a vehicle. Method 600A may rely on training data associated with a plurality of vehicles that may be different from the vehicle for which an interactive multimedia content and annotations are generated in method 400. The above described plurality of vehicles associated with the training data may be referred to as "reference vehicles," and may belong to the same vehicle profile, or share at least some vehicle-specific identifying information (e.g., same manufacturer, same class, same year of manufacture, etc.) as the vehicle for which the interactive multimedia content and annotations is being requested. The training data may be obtained, e.g., from external systems (e.g., computing systems of vehicle manufacturer and/or dealerships). Also or alternatively, the training data (e.g., multimedia content of one or more aspects of the reference vehicles) may be periodically obtained and saved, e.g., in the multimedia content repository 356 of server system 350. As will be described further, each of the trained classification models may be specific to an aspect of a vehicle and/or vehicle profile. For example, each trained classification model may be able to identify an instance of damage to an exterior or interior region, an electrical and/or mechanical component of the vehicle, and/or a performance of the vehicle, based on an input of multimedia content data (e.g., image data) corresponding to the exterior or interior region, the electrical and/or mechanical component of the vehicle, and/or the performance of the vehicle.

Thus, at step 602, the device may receive, for each of a plurality of aspects for a reference vehicle, at least, (1) a first set of images showing a first level of damage to an aspect of the reference vehicle, and a (2) a second set of images showing a second level of damage to the aspect of the reference vehicles. The "reference vehicle," although used singularly, may refer to more than one vehicle that belongs to a specific vehicle profile or that share at least some vehicle-specific identifying information as the vehicle for which the interactive multimedia content and annotations is requested. A level of damage may refer to a degree of damage and may include an absence of any damage (e.g., no damage). The damage may include, for example, a deterioration, a dent, a rupture, a decrease in performance, an unusual sound or activity, a malfunction, etc. The first set of images and second set of images may be saved, e.g., in the multimedia content repository of 356 of server system 350 and may be labeled or marked accordingly (e.g., to indicate the aspect it represents and/or the vehicle profile of the reference vehicle associated with the image).

Furthermore, the device may associate image data from the first set of images with the first level of damage and may associate image data from the second set of images with the second level of damage (e.g., as in step 604). The association may be a mapping or linkage between a domain (e.g., image data) and a range (e.g., level of damage) to further the formation of a mathematical relation for machine learning purposes. The first set of images and second set of images may be processed by the device to create their respective image data.

At step 606, (e.g., for each of the plurality of aspects of the reference vehicles) the device may train a classification model for the reference vehicle using the associated image data. The training may involve determining a mathematical relation between the domain (e.g., image data) and the range (e.g., level of damage) of the training data. Furthermore, the training may involve classifications of a type of image data that lead to a finding of an instance of damage from another type of image data that lead to a finding of no damage. However, the types of image data may not necessarily have to correspond with the image data of the first set of images and the image data of the second set of images, respectively. Furthermore, more than two sets of images and their respective image data may be used in the training phase, for example, to learn the identification of a greater variability in the severity of damage to an aspect of a vehicle. Examples of classification models that may be used in the training may include, but are not limited to, k-nearest neighbor algorithms, case-based reasoning, decision trees, Bayes classifiers, and artificial neural networks. Each of the trained classification model may be used to identify an instance of damage to an aspect of a vehicle belonging to a vehicle profile, from image data of an image of the aspect of the vehicle. Thus a trained classification model may be created for each of the one or more aspects of the vehicle from the vehicle profile. In some aspects, the trained classification model for one aspect of vehicles belonging to one vehicle profile may be applicable to the same aspect of another vehicles belonging to another vehicle profile. For example, some aspects of a vehicle, such as an engine performance, may be similar or identical across various vehicle profiles (e.g., an engine from a 2019 TOYOTA COROLLA may be the same as the engine from a 2019 TOYOTA CAMRY). At step 608, the trained classification models may thus be stored, e.g., in the vehicle profiles database 358 of the server system 350. In aspects where the training of the classification models (e.g., steps 602 through 606 of method 600A) occurs at an external system, the server may receive the trained classification and store them accordingly. The trained classification models may be indexed and/or labeled based on the aspect of the reference vehicle associated with the trained classification models, and based on the vehicle profile of the reference. The indexing and/or labeling (e.g., during storage) may ensure efficient identification and retrieval of the trained classification model in method 600B, as will be discussed below.

As discussed previously, method 600B may describe example steps for applying the training classification model to identify an instance of damage from multimedia content data (e.g., image data) corresponding to one or more aspects of a vehicle. The vehicle, for which the instances of damage to one or more of its aspects will be identified, may be the vehicle for which interactive multimedia content and annotations are requested (e.g., as in the vehicle 206 shown in FIG. 2.

At step 610, the server may determine a vehicle profile for the vehicle for which the interactive multimedia content and annotations is requested. As discussed previously in relation to step 404 shown in FIG. 4, the server may receive vehicle-specific identifying information of the vehicle. The vehicle-specific identifying information may provide sufficient information for the server to determine a vehicle profile of the vehicle (e.g., as in step 610). The determined vehicle profile may assist the server in identifying and retrieving the relevant trained classification model in subsequent steps.

At step 612, and as discussed previously in relation to step 408 shown in FIG. 4, the server may receive images showing one or more aspects of the vehicle. Image data (or other computer readable media) may be extracted from the images (e.g., as discussed previously in relation to step 410 show in FIG. 4) to be input into the trained classification models.

At step 614, the server may identify and retrieve, based on the vehicle profile of the vehicle, one or more trained classification models for the one or more aspects of the vehicle. The one or more trained classification models may have been trained using method 600A and stored (e.g., from step 608) based on vehicle profile information. The vehicle-specific identifying information of the vehicle for which interactive multimedia content is requested may be used to determine the vehicle profile of the vehicle. As discussed previously, classification models may be trained (e.g., via method 600A) to identify instances of damage to a specific aspect of a vehicle belonging to a vehicle profile. Since the trained classification models may be specific to an aspect of vehicles belonging to the vehicle profile, the server may use the determined vehicle profile of the vehicle to identify and retrieve a trained classification model for each of the one or more aspects of the vehicle profile of the vehicle.

At step 616, for each of the one or more aspects of the vehicle, the server may input image data of the received images into the trained classification model corresponding to each aspect. As was discussed previously in relation to method 600A, the classification models may be trained so that an input of image data of an image corresponding to an aspect of a vehicle would output instances of damage.

Thus, at step 618, the server may determine any one or more instances of damage to the vehicle using the trained classification models. For example, the server may aggregate the instances of damage to each of the one or more aspects of the vehicle to determine the instances of damage to the vehicle as a whole. As discussed previously, in relation to method 400 shown in FIG. 4, the server may annotate the instances of damage with relevant information and generate an interactive multimedia content of the vehicle.

Figure 7:
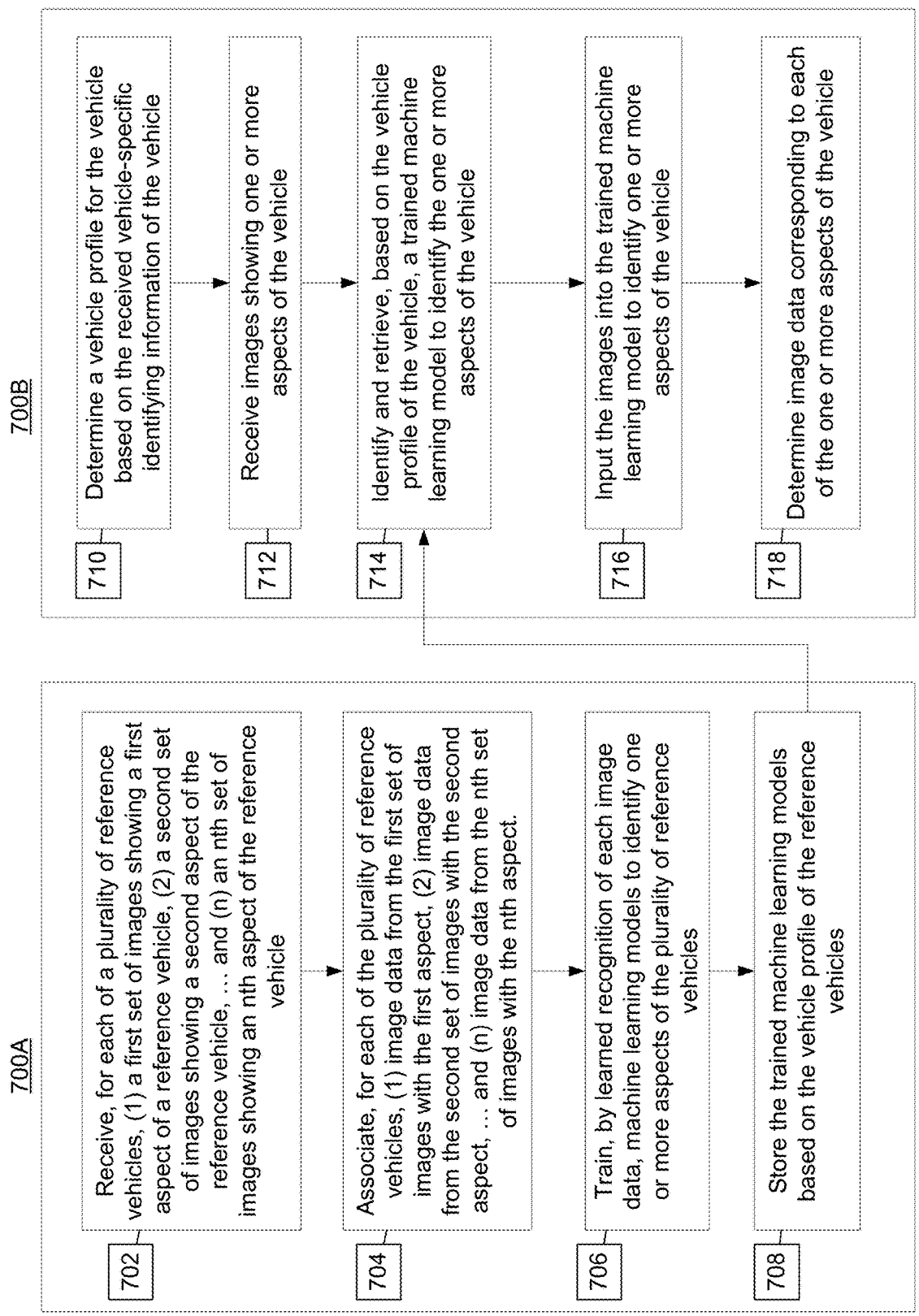
FIG. 7 depicts a flow diagram of an example method for training and applying a machine learning model to identify one or more aspects of a vehicle, in accordance with one or more illustrative aspects discussed herein.

FIG. 7 depicts a flow diagram of example methods for training a machine learning model (e.g., method 700A) and applying the machine learning model (e.g., method 700B) to identify one or more aspects of a vehicle, in accordance with one or more illustrative aspects discussed herein. Thus, while classification models described in relation to FIG. 6 may be used to determine instances of damage to one or more aspects of a vehicle, the machine learning models described in relation to FIG. 7 may be used to identify one or more aspects of a vehicle, e.g., from images of a vehicle. For example, method 700B may be used by the server to identify, from an image of a region of a vehicle received from the staging area system, that the received image is of a front exterior region of the vehicle, while method 600B may be used by the server to determine any instances of damage to the front exterior region of the vehicle. Furthermore, FIG. 7 describes an example of one or more steps that may be performed prior to, in parallel to, or subsequent to steps 409 and 410 of method 400, as shown in FIG. 4. Methods 700A (e.g., the training phase of the machine learning model) and 700B (e.g., the application phase of the machine learning model) may be performed by the server of method 400 (e.g., server system 350 shown in FIG. 3, server 201 shown in FIG. 2, and/or computing device 101 shown in FIG. 1). In some aspects, however, method 700A (e.g., the training phase) may be performed by an external system, and the resulting trained machine learning model may be provided to the server for use in method 700B. For convenience, "server" may be used herein to identify the performer of one or more steps of method 700B (e.g., the application phase), and "device" (which may or may not necessarily be the server) may be used herein to identify the performer of one or more steps of method 700A (e.g., the training phase). While image data is being used in methods 700A and 700B, it is contemplated that other forms of multimedia content data (e.g., audio data, video data, etc.) may additionally be used and/or may be substituted for the image data.

Method 700A may describe example steps for training machine learning models that are able to identify an aspect of a vehicle (e.g., an exterior or interior region of a vehicle) from image data of an image of the aspect of the vehicle. Based on the identification, the image and/or image data may be labeled or indexed as pertaining to the identified aspect. Method 700A may rely on training data associated with a plurality of vehicles that may be different from the vehicle for which an interactive multimedia content and annotations are generated in method 400. The above described plurality of vehicles associated with the training data may be referred to as "reference vehicles," and may belong to the same vehicle profile, or share at least some characteristics (e.g., same manufacturer, same class, same year of manufacture, etc.) as the vehicle for which the interactive multimedia content and annotations is being requested. The training data may be obtained, e.g., from external systems (e.g., computing systems of vehicle manufacturer and/or dealerships). Also or alternatively, the training data (e.g., multimedia content of one or more aspects of the reference vehicles) may be periodically obtained and saved, e.g., in the multimedia content repository 356 of server system 350. As will be described further, each of the trained machine learning models may be specific to a vehicle profile. For example, each trained machine learning model may be able to input image data of an image of a part of the vehicle (e.g. a front exterior region of the vehicle) and output a recognition or identification of the image as displaying a specific aspect of the vehicle (the front exterior region of the vehicle).

Referring to method 700A, the device may receive, for each of a plurality of reference vehicles, various sets of images, wherein each set of images may show an aspect of the reference vehicle. For example, the device may receive (1) a first set of images showing a first aspect of the reference vehicle, (2) a second set of images showing a second aspect of the reference vehicle, . . . and (n) an nth set of images showing an nth aspect of the reference vehicle. The plurality of reference vehicles may belong to a vehicle profile, as different vehicle profiles may yield different characteristics for the one or more aspects (e.g., a TOYOTA COROLLA SEDAN may have a different shape than a TESLA SUV). Since the plurality of reference vehicles may belong to a specific vehicle profile, the resulting trained machine learning model in method 600A may be specific to a vehicle profile. Nevertheless, in some aspects, the trained machine learning models need not be specific to a vehicle profile. For example, some aspects of a vehicle, such as the interior back seats, may be similar or identical across various vehicle profiles (e.g., the interior back seats of a 2019 TOYOTA COROLLA may appear to be the same as the interior back seats of a 2019 HONDA ACCORD).

For each of the plurality of reference vehicles, the device may associate image data of each of the various sets of images with the aspect that the set of images represents (e.g., as in step 704). Thus, the device may associate, for each of the plurality of reference vehicles, (1) image data from the first set of images with the first aspect, (2) image data from the second set of images with the second aspect, . . . and (n) image data from the nth set of images with the nth aspect. The association may be a mapping or linkage between a domain (e.g., image data) and a range (e.g., an identification of the aspect represented by the image of the image data) to further the formation of a mathematical relation for machine learning purposes. The sets of images may be processed by the device to create their respective image data.

At step 706, the device may train machine learning models to identify the one or more aspects of the plurality of reference vehicles, using image data of images representing the one or more aspects. The training may be by learned recognition of various features of an image data that signify or are emblematic of the aspect represented. The training may involve determining a mathematical relationship between the domain (e.g., image data) and the range (e.g., an identification of the aspect represented by the image of the image data) of the training data.

At step 708, the device may store the trained machine learning models for retrieval, e.g., in method 700B. The trained machine learning models may be stored in the server (e.g., as the trained models for aspect identification 360 in the vehicle profiles database 358 of the server system 350). The trained machine learning models may be indexed and/or labeled based on the vehicle profile of the reference vehicles. The indexing and/or labeling (e.g., during storage) may ensure efficient identification and retrieval of the trained classification model in method 600B, as will be discussed below.

As discussed previously, method 700B may describe example steps for applying the training machine learning models to recognize and/or identify one or more aspects of a vehicle in a multimedia content representing the one or more aspects of a vehicle from multimedia content data (e.g., image data) of the multimedia content. The vehicle, for which the instances of damage to one or more of its aspects will be identified, may be the vehicle for which interactive multimedia content and annotations are requested (e.g., as in the vehicle 206 shown in FIG. 2.

At step 710, the server may determine a vehicle profile for the vehicle for which the interactive multimedia content and annotations is requested. As discussed previously in relation to step 404 shown in FIG. 4, the server may receive vehicle-specific identifying information of the vehicle. The vehicle-specific identifying information may provide sufficient information for the server to determine a vehicle profile of the vehicle (e.g., as in step 710). The determined vehicle profile may assist the server in identifying and retrieving the relevant trained machine learning model in subsequent steps.

At step 712, and as discussed previously in relation to step 408 shown in FIG. 4, the server may receive images showing one or more aspects of the vehicle. Image data (or other computer readable media) may be extracted from the images (e.g., as discussed previously in relation to step 410 show in FIG. 4) to be input into the trained machine learning models.

At step 714, the server may identify and retrieve, based on the vehicle profile of the vehicle, a trained machine learning model associated with the vehicle profile of the vehicle. As discussed previously, machine learning models may be trained (e.g., via method 700A) to identify and/or recognize aspects of a vehicle (e.g., interior and exterior regions of a vehicle) from image data of images of the vehicle.

At step 716, the server may input image data of the received images into the trained machine learning model. As was discussed previously in relation to method 600A, the machine learning models were trained so that an input of image data of an image corresponding to an aspect of a vehicle would output an identification of the aspect (e.g., "this image represents the front exterior of the 2019 TOYOTA COROLLA LE").

Thus, at step 718, the server may determine aspects represented in the images receive in step 712 (and step 408 as shown in FIG. 4), via the trained machine learning model. The identification of aspects represented by the images may be useful in subsequent steps of method 400, as shown in FIG. 4. For example, the server may use the identified aspects to identify and retrieve trained classification models to detect any instances of damage to the each of the identified aspects (e.g., using method 600B discussed previously).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A system comprising:
a first device comprising:
one or more first processors; and
a first memory storing first instructions that, when executed by the one or more first processors, cause the first device to:
receive vehicle-specific identifying information of a vehicle;
receive, from a second device, multimedia content showing one or more aspects of the vehicle, wherein the one or more aspects are associated with one or more exterior regions of the vehicle;
determine from the received multimedia content, image data corresponding to each of the one or more aspects of the vehicle;
for each of the one or more aspects of the vehicle, determine, using a trained classification model, one or more instances of damage to the aspect;
annotate, based on the one or more instances of damage, the image data corresponding to the aspect to indicate the one or more instances of damage; and
associate, to the one or more instances of damage, any accident-specific data determined from an accident report of the vehicle; and
generate an interactive multimedia content associated with the vehicle, wherein the interactive multimedia content comprises the annotated image data indicating the one or more instances of damage and the accident-specific data associated with the one or more instances of damage; and
the second device comprising:
one or more image sensors;
one or more second processors; and
a second memory storing second instructions that, when executed by the one or more second processors, cause the second device to:
detect, using the one or more image sensors, that the vehicle is entering a predetermined area associated with the second device;

generate, using the one or more image sensors, the multimedia content showing the one or more aspects of the vehicle; and
send the multimedia content to the first device.

2. The system of claim 1, wherein the first instructions, when executed by the one or more first processors, cause the first device to:
prior to the determining the one or more instances of damage,
receive, for each of a plurality of aspects of reference vehicles, a first set of images and a second set of images, wherein the first set of images shows a first level of damage to the aspect of the reference vehicle, and wherein the second set of images shows a second level of damage to the aspect of the reference vehicle;
train, using the first set of images and the second set of images, and based on detecting the first level of damage and the second level of damage, a classification model for the vehicle; and
store the trained classification model in the first memory.

3. The system of claim 2, wherein the first instructions, when executed by the one or more first processors, cause the first device to:
prior to the determining the one or more instances of damage,
identify, based on the vehicle-specific identifying information of the vehicle, a trained classification model from a plurality of trained classification models stored in the first memory.

4. The system of claim 1, wherein the first instructions, when executed by the one or more first processors, cause the first device to determine the image data by:
inputting, into a trained machine learning model, the received multimedia content to detect the one or more exterior regions of the vehicle.

5. The system of claim 4, wherein the first instructions, when executed by the one or more first processors, cause the first device to:
prior to the inputting the received multimedia content into the trained machine learning model,
receive, for each of the one or more aspects of a plurality of reference vehicles, training data comprising:
multimedia content showing the aspect of the plurality of reference vehicles, and
an identification of image data of the multimedia content corresponding to the aspect;
train, by learned recognition of the image data corresponding to each of the one or more aspects from the multimedia content, a machine learning model; and
store the trained machine learning model in the first memory.

6. The system of claim 5, wherein each of the plurality of reference vehicles shares one or more vehicle-specific identifying information with the vehicle.

7. The system of claim 1, wherein the first instructions, when executed by the one or more first processors, cause the first device to:
receive, from the second device, a time of generation of the multimedia content showing the one or more aspects of the vehicle, and
annotate, based on the time of generation of the multimedia content, the image data to further indicate a time of detecting the one or more instances of damage.

8. The system of claim 7, wherein the time of generation of the multimedia content is received as metadata of the received multimedia content showing the one or more aspects of the vehicle.

9. The system of claim 1, wherein the first instructions, when executed by the one or more first processors, cause the first device to:
prompt an input comprising further information associated with the one or more instances of damage;
receive, in response to the prompting, the input comprising the further information associated with the one or more instances of damage; and
generate a revised interactive multimedia content of the vehicle, wherein the revised interactive multimedia content comprises the annotated image data indicating the one or more instances of damage and the further information associated with the one or more instances of damage.

10. The system of claim 1, wherein the first instructions, when executed by the one or more first processors, cause the first device to:
send, to a third device, the interactive multimedia content of the vehicle; and wherein the system further comprises:
the third device comprising:
a user interface;
a display screen one or more third processors; and
a third memory storing second instructions that, when executed by the one or more third processors, cause the third device to:
receive, from the first device, the interactive multimedia content of the vehicle
receive a request to view the interactive multimedia content of the vehicle;
display the interactive multimedia content of the vehicle on the display screen; and
enable, through the user interface, an interaction with the interactive multimedia content to display the one or more aspects of the vehicle.

11. A method comprising:
receiving vehicle-specific identifying information of a vehicle;
generating, using one or more image sensors, multimedia content showing one or more aspects of the vehicle, wherein the one or more aspects are associated with one or more exterior regions of the vehicle;
determining from the generated multimedia content, image data corresponding to each of the one or more aspects of the vehicle;
for each of the one or more exterior regions of the vehicle, determining, using a trained classification model, any one or more instances of damage to the aspect;
annotating, based on the one or more instances of damage, the image data corresponding to the aspect to reflect an indication of the one or more instances of damage; and
associating, to the one or more instances of damage, any accident-specific data determined from an accident report of the vehicle;
generating an interactive multimedia content associated with the vehicle, wherein the interactive multimedia content comprises the annotated image data indicating the one or more instances of damage and the accident-specific data associated with the one or more instances of damage; and displaying, through a user interface and responsive to a request, the interactive multimedia content of the vehicle.

12. The method of claim 11, further comprising:
prior to the determining the any one or more instances of damage of the aspect,
receiving, for each of a plurality of exterior regions of a plurality of reference vehicles, a first set of images of the aspect showing no instances of damage, and a second set of images of the aspect showing one or more instances of damage;
training a classification model using the first set of images and the second set of images for each of the one or more aspects of the reference vehicles, wherein the classification model is trained to detect one or more instances of damage on an aspect of the vehicle; and
storing the trained classification model.

13. The method of claim 11, wherein the determining, from the generated multimedia content, the image data corresponding to each of the one or more aspects of the vehicle further comprises:
inputting the generated multimedia content into a trained machine learning model to detect the one or more aspects of the vehicle.

14. The method of claim 13, further comprising:
prior to the inputting the generated multimedia content into the trained machine learning model,
receiving, for each of the one or more aspects of a plurality of reference vehicles, training data comprising:
multimedia content showing the aspect of the plurality of reference vehicles, and
an identification of image data of the multimedia content corresponding to the aspect;
training a machine learning model by learning recognition of the image data corresponding to each of the one or more aspects from the received multimedia content; and
storing the trained machine learning model.

15. The method of claim 11, further comprising:
receiving, as metadata of the generated multimedia content showing the one or more aspects of the vehicle, a time of generation of the multimedia content; and
annotating, based on the time of generation of the multimedia content, the image data to further indicate a time of detecting the one or more instances of damage.

16. The method of claim 11, further comprising:
prompting an input comprising further information associated with the one or more instances of damage;
receiving, in response to the prompting, the input comprising the further information associated with the one or more instances of damage; and
generating a revised interactive multimedia content of the vehicle, wherein the revised interactive multimedia content comprises the annotated image data reflecting the indication of the one or more instances of damage and the further information associated with the one or more instances of damage.

17. One or more non-transitory storage media storing instructions that, when executed by one or more processors, cause the one or more processors to perform steps comprising:
a training phase comprising:
receiving, for each of one or more aspects of a plurality of reference vehicles, a first training data comprising
multimedia content comprising image data showing the aspect of the plurality of reference vehicles, and
an identification of each aspect of the one or more aspects shown by the image data, wherein the one or more aspects of the plurality of reference vehicles are associated with one or more exterior regions of the plurality of reference vehicles; and
training, using learned recognition of each aspect, and based on the image data, a machine learning model from the multimedia content;
storing the trained machine learning model for an application phase;
receiving, for each of a plurality of exterior regions of the plurality of reference vehicles, a second training data comprising:
a first set of images showing a first level of damage to the aspect of the reference vehicles, and
a second set of images showing a second level of damage to the aspect of the reference vehicles;
training a classification model using the first set of images and the second set of images for each of the one or more aspects of the reference vehicles, wherein the classification model is trained to detect one or more instances of damage on an aspect of a vehicle different from the reference vehicles; and
storing the trained classification model for the application phase; and
the application phase comprising:
receiving vehicle-specific identifying information of the vehicle;
generating, using one or more image sensors, multimedia content showing one or more aspects of the vehicle, wherein the one or more aspects are associated with one or more exterior regions of the vehicle;
inputting the generated multimedia content into the trained machine learning model to detect the one or more aspects of the vehicle;
determining image data corresponding to each of the one or more aspects of the vehicle;
for each of the one or more aspects of the vehicle,
determining, using the trained classification model, one or more instances of damage to the aspect;
annotating, based on the determined one or more instances of damage, the image data corresponding to the aspect to indicate the one or more instances of damage; and
associating, to the one or more instances of damage, any accident-specific data determined from an accident report of the vehicle;
generating an interactive multimedia content associated with the vehicle, wherein the interactive multimedia content comprises the annotated image data indicating the one or more instances of damage and accident-specific data associated with the one or more instances of damage; and
sending, to a device for display and responsive to a request, the interactive multimedia content of the vehicle.

18. The one or more non-transitory storage media of claim 17, storing instructions that, when executed by the one or more processors, cause the one or more processors to perform steps further comprising:
receiving, as metadata of the generated multimedia content showing the one or more aspects of the vehicle, a time of generation of the multimedia content; and annotating, based on the time of generation of the multimedia content, the image data to further indicate a time of detecting the one or more instances of damage.

\* \* \* \* \*